May 9, 1950 — W. G. PATRIQUIN — 2,507,266
SHOCK ABSORBER
Filed July 11, 1947
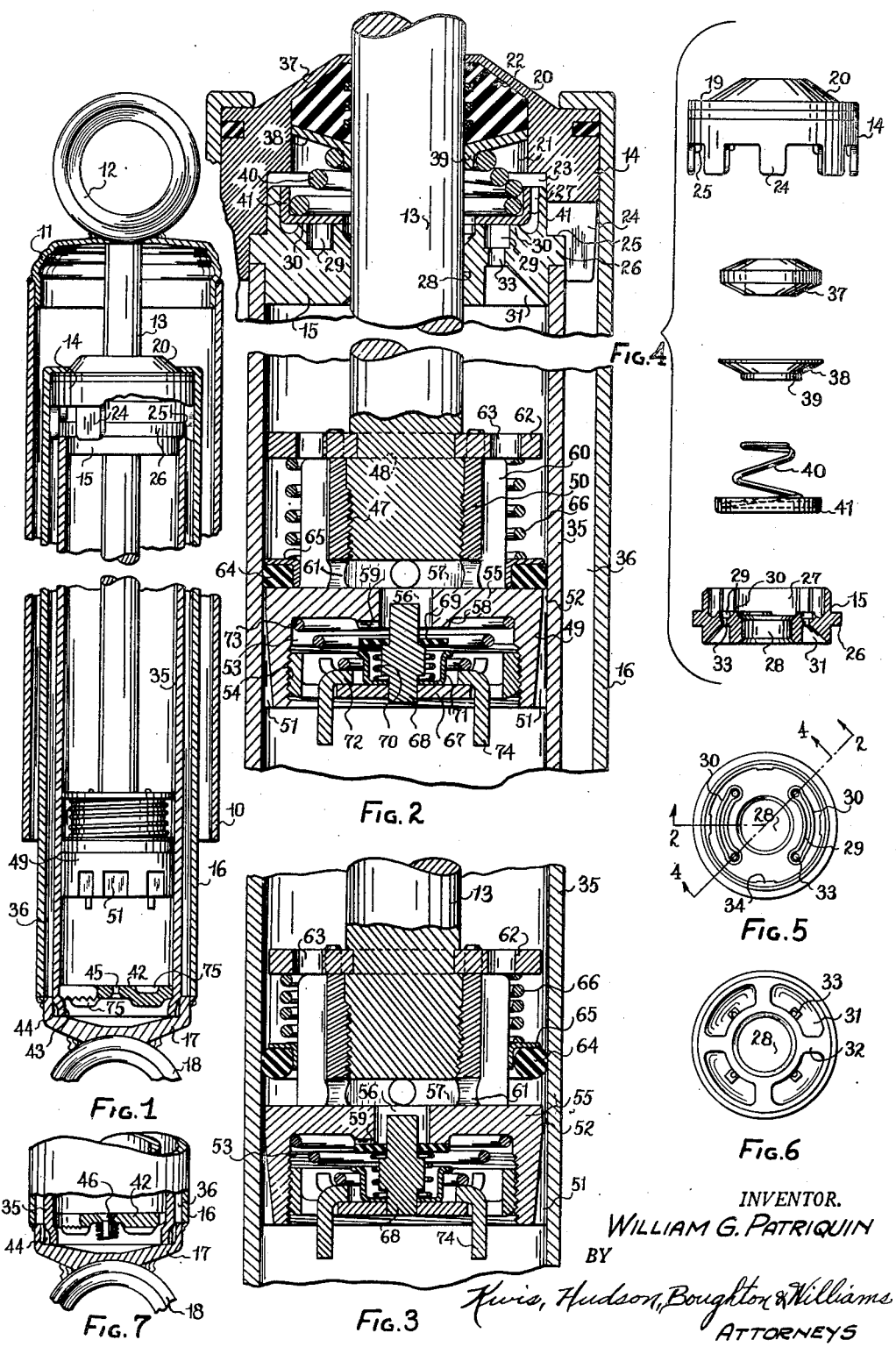
INVENTOR.
WILLIAM G. PATRIQUIN
BY
Kwis, Hudson, Boughton & Williams
ATTORNEYS Patented May 9, 1950

2,507,266

UNITED STATES PATENT OFFICE 2,507,266

SHOCK ABSORBER

William G. Patriquin, Cleveland, Ohio, assignor to The Gabriel Company, Cleveland, Ohio, a corporation of Ohio Application July 11, 1947, Serial No. 760,264

2 Claims. (Cl. 188—88)

This invention relates to a fluid shock absorber and, particularly, to a direct double-acting tubular telescopic hydraulic shock absorber in which environment it has particular utility.

An object of the invention is to provide a fluid shock absorber and, particularly, a direct double-acting tubular telescopic hydraulic shock absorber wherein means is embodied to prevent the creation of excessive pressures in the working cylinder of the shock absorber due to viscosity changes in the oil, quick and sudden strokes of the piston, rapid oil displacement by the piston rod during the impact stroke, builtup pressures in the working cylinder on the recoil stroke, or for any other reason whereby excessive pressure may be developed in the working cylinder.

Another object of the invention is to provide in a shock absorber of the type specified improved and novel relief valve means, which means also provides for the venting from the working cylinder of air which may be entrapped in the cylinder or entrained in the oil.

A still further object is to provide, in connection with the relief valve means referred to in the last object, provision for quickly reducing the pressure of the vented air to thus eliminate the production of foam.

Another and important object is to provide in a shock absorber and relief valve means therefor of the character hereinbefore referred to, an arrangement whereby the same spring performs the dual function of a relief valve spring and a packing spring, thus reducing the number of parts in the shock absorber construction and effecting an economy in manufacturing costs.

A further object is to provide in a shock absorber of the character referred to, improved and novel means for preventing the development of excessive heat in the shock absorber since the oil flowing through the relief valve and into the expansion chamber beyond said valve will in its flow therefrom to the reservoir cascade exteriorly over the wall of the working cylinder.

A still further object of the invention is to provide a direct double-acting tubular telescoping hydraulic shock absorber which can readily be adapted to function as that type of shock absorber wherein the oil is forced from one end of the working cylinder into the reservoir and is returned from the reservoir through said one end to the working cylinder during the strokes of the piston in opposite directions or as that type of shock absorber wherein the oil is drawn into the working cylinder from the reservoir through said one end and is forced out of the working cylinder into the reservoir through the opposite end during the strokes of the piston in opposite directions, such latter type being similar to the circulating type of shock absorber.

Further and additional objects and advantages of the invention not hereinbefore expressly stated will become apparent hereinafter during the detailed description of an embodiment of the invention which is to follow.

Referring to the accompanying drawing illustrating said embodiment of the invention, Fig. 1 is a longitudinal view of a direct double-acting tubular telescoping hydraulic shock absorber, partly in section and partly in elevation, with the invention applied thereto;

Fig. 2 is a fragmentary longitudinal sectional view through the shock absorber shown in Fig. 1 and on a larger scale, with the movable parts of the piston shown in the relationship that they may have during the recoil stroke of the shock absorber, that is, during the expansion of the springs of the vehicle on which the shock absorber is mounted, the section through the closure plug for the upper end of the machine cylinder being taken substantially on irregular line 2—2 of Fig. 5, looking in the direction of the arrows;

Fig. 3 is a view similar to a portion of Fig. 2 but showing the relationship which the movable parts of the piston may have during the impact stroke of the shock absorber, that is, during the compression of the springs of the vehicle on which the shock absorber is mounted;

Fig. 4 is an exploded view with all of the parts but one in elevation, said one part being in section and constituting the closure plug for the upper end of the working cylinder, the section being taken along line 4—4 of Fig. 5, looking in the direction of the arrows;

Fig. 5 is a top plan view of the closure plug for the upper end of the working cylinder;

Fig. 6 is a bottom plan view of said closure plug; and

Fig. 7 is a fragmentary partly elevational and partly sectional view of the lower end of the shock absorber similar to that in Fig. 1 but showing only a replenishing valve carried by the closure plate for the lower end of the working cylinder, while Fig. 1 shows such plate as provided with a fixed or constantly open orifice with which a replenishing valve may or may not be used.

Although the invention has utility in other types of shock absorbers, it is illustrated and described herein as embodied in a direct double-acting tubular telescopic hydraulic shock absorber inasmuch as it has special utility in this environment.

Referring to the accompanying drawing and particularly to Fig. 1, the shock absorber illustrated includes a tubular shield or guard member 10, the lower end of which is open and the upper end of which is closed by an inverted cup-shaped closure member 11 which extends into the tubular guard member 10 and is secured thereto by suitable means as, for instance, by welding. The closure member 11 has secured to it an eye and also the upper end of the piston rod 13. The piston rod 13 extends through a central opening in a closure cap 14 for the shock absorber and later to be described in detail and through a central opening in the closure plug 15 for the upper end of the working cylinder (later to be described in detail) and into said working cylinder.

The shock absorber further includes a tubular housing 16, the upper end of which embraces the closure cap 14 and is flanged inwardly over a portion of said cap and secured thereto. The lower end of the tubular housing 16 embraces and is welded or otherwise secured to an upwardly facing cup-shaped closure member 17 which has fixed to its outer side a ring or eye 18.

In mounting the shock absorber upon a motor vehicle, similar mounting pins or trunnion rods (not shown) may be connected, respectively, to the frame and axle of the vehicle in any suitable manner so as to extend outwardly therefrom in parallel relationship and pass through the eyes 12 and 18. These pins or rods may be operatively connected with the eyes 12 and 18 by suitable means, well known in the art, wherefor relative movement between the frame and axle of the vehicle as the vehicle springs are compressed or expanded will cause relative telescoping movement between the guard member 10 and the housing 16 and relative movement of the piston rod 13 and the piston secured thereto with respect to the working cylinder as will be hereinafter further explained and as is well understood in the art. The closure cap 14 is formed with a planular and annular surface 19 over which the upper end of the housing 16 is flanged. The closure cap 14 is further provided with an outwardly or upwardly extending conical portion 20 surrounded at its base by the surface 19. The cap 14 interiorly has a counterbore 21 concentric to the central opening in the conical portion 20 and with its end adjacent said central opening formed with an outwardly convergent taper 22 complementary to the taper of the exterior of the portion 20. The cap 14 is further provided with a larger counterbore 23 and from the lower or inner edge of the cap there are a plurality of inwardly or downwardly circumferentially spaced legs 24. The legs 24 have their outer surfaces inclined slightly inwardly and downwardly whereby, as reference to Fig. 2 will indicate, there is an upwardly increasing clearance between the housing 16 and the outer surface of the legs 24 until finally the inner surface of the housing is bearing against the circumference of the cap 14. The legs 24 are each provided on their inner sides with abutment shoulders 25 located below the inner or lower edge of the cap member for a purpose now to be explained.

The closure plug 15 for the upper end of the working cylinder is a cylindrical member provided intermediate its ends with an outstanding rib or shoulder 26. The plug 15 is provided adjacent its outer end with a counterbore 27 that is concentric to the central bore 28 in the plug. The bottom of the counterbore 27 is provided with two arcuate grooves 29 shown as substantially concentric to the bore 28 and having around their perimeters slightly raised walls 30 constituting metal valve seats, as will later become clear. The plug 15 in its inner or lower end is provided outwardly of the bore 28 with arcuate grooves 31 separated by reinforcing ribs 32 and having their outer walls tapered inwardly from the inner end of the plug toward the outer end thereof. In the form illustrated, four such grooves 31 are shown and in each groove is an opening 33 or port extending axially of the plug and communicating with the grooves 29 in the bottom of the counterbore 27, it being noted that there is a port or opening 33 at each end of each groove 29. The wall of the counterbore 27 is provided with four circularly spaced inwardly extending locating lugs 34, the purpose of which will shortly be clear.

The plug 15 has its upper end extending into the larger counterbore 23 in the cap 14, while the upper side of the rib or shoulder 26 of the plug 15 bears against the abutment shoulders 25 on the inner side of the legs 24. The upper end of the working cylinder 35 embraces the inner end of the plug 15 and abuts the inner side of the rib 26 and is secured to said plug. It will be noted that the working cylinder 35 is spaced radially inwardly of the housing 16 to provide an annular space therebetween which constitutes the reservoir 36. It will further be noted that the reservoir 36 is in communication with the counterbore 27 in the plug 15 due to the spaces between the legs 24 of the cap 14. The purpose of this arrangement will be explained in greater detail hereinafter.

A double conical packing ring 37, formed of suitable material such as synthetic rubber, is mounted in the counterbore 21 of the cap 14 with one conical surface thereof engaging the conical wall 22 while the other conical surface thereof engages within a conical washer 38 provided with a cylindrical portion 39. The portion 39 of the washer 38 is located within the smaller or outer end of a conical coil spring 40, the said end of said spring abutting the washer 38. The opposite and larger end of said spring is located in and abuts against a cup valve member 41 which is provided with a central opening registering with the counterbores and opening in the cap 14 and with the counterbore 27 and bore 28 in the plug 15. The cup 41 is located in the counterbore 27 and is centered therein by the lugs 34 with said cup bearing upon the slightly raised walls 30 extending around the perimeters of the grooves 29 in the plug 15. It will be seen that the coil spring 40 performs a dual function, namely it exerts pressure on the double conical packing ring 37 to cause said ring to tightly grip the piston rod 13 and it also functions to hold the cup 41 seated with a metal-to-metal contact against the slightly raised walls 30. The cup 41 performs the dual function of a spring centering and abutment cup and a relief valve, all as will be fully pointed out hereinafter. It will be understood that the piston rod passes through the cap 14, packing ring 37, washer 38, cup 41, and the counterbore 27 and bore 28 in the plug 15, and into the working cylinder 35.

The lower end of the cylinder 35 extends into the cup-shaped closure member 17 and is secured thereto by suitable means understood in the art. The cylinder 35 slightly upwardly of the lower end has secured therein a closure plate 42, and below said plate the cylinder is provided with an inwardly extending bead 43 which serves to retain the closure plate in position. The cup-shaped closure member 17 is provided with a plurality of circumferentially spaced axially extending internal grooves or channels 44 which place the reservoir 36 in communication with the space between the closure plate 42 and the bottom of the cup-shaped closure member 17. The closure plate 42, as shown in Fig. 1, is provided with a fixed or constantly open orifice 45 and, if desired, said plate might also be provided with a second opening in which a replenishing valve is mounted to facilitate the return flow of oil from the reservoir to the working cylinder. In Fig. 7, the closure plate 42 does not have a fixed or constantly open orifice but is simply provided with an opening in which a spring pressed replenishing valve 46 is mounted, as will be well understood in the art.

The shock absorber utilizing the closure plate 42, as shown in Fig. 1, functions so that upon the impact stroke the oil is forced through the fixed orifice from the working cylinder and into the reservoir, while on the recoil stroke the oil is drawn from the reservoir through the fixed orifice 45 and, if a replenishing valve is employed, through the replenishing valve and into the working cylinder. When the shock absorber is provided with the closure plate 42 as shown in Fig. 7, then no oil passes through the closure plate during the impact stroke, but the oil displaced by the piston rod flows to the reservoir through the openings 33 in the closure plug 15 at the upper end of the working cylinder as will later be explained. In this instance the recoil stroke of the piston causes the replenishing valve 46 to lift off its seat whereupon oil is drawn from the reservoir into the working cylinder during such recoil stroke. The shock absorber, when equipped with a closure plate 42 as shown in Fig. 7, functions in the nature of that type of shock absorber known as the circulating type.

The piston rod 13 at its inner end is externally threaded as indicated at 47 (see Figs. 2 and 3) and is provided above the threads 47 with an annular recess or groove 48. The piston comprises a body which may be formed in various ways, but preferably it is a die casting. The piston body includes a lower and larger portion 49 and an upper and reduced portion 50. The periphery of the lower portion 49 of the piston body is provided with a plurality of circularly spaced axially extending grooves or passages 51, and said grooves or passages are deeper at their lower ends than they are at their upper ends for the purpose of decreasing the resistance of the flow of fluid through the grooves during the impact or compression stroke of the piston. The periphery of the piston intermediate the grooves 51 has a sliding contact with the wall of the cylinder 35. The portion 49 of the piston body above the grooves 51 is of less diameter than the internal diameter of the cylinder 35 wherefor an annular space 52 is provided between the cylinder and the periphery of the upper end of the piston portion 49. The lower portion 49 of the piston body is provided with a counterbore 53, the wall of which is threaded as indicated at 54 for a purpose later to be explained. The inner end of the counterbore 53, that is, the upper end of the portion 49 of the piston body, is separated from the upper reduced or smaller piston portion 50 by a wall 55 in the center of which is a bore 56 communicating with the counterbore 53 and with a larger central bore 57 in the upper portion 50 of the piston body. The wall 55 surrounding the bore 56 and within the counterbore 53 is provided with an annular recoil valve seat boss 58 projecting into the counterbore and provided with one or more bleed grooves or notches 59.

The upper portion 50 of the piston body is provided with the previously referred to central bore 57 which is threaded so that the threaded end 47 of the piston rod can be screwed into the bore 57 in uniting the piston body to the piston rod. The upper portion or part 50 is also provided radially outwardly of the bore 57 with a plurality of circularly spaced axially extending peripheral recesses or grooves 60 which extend from the piston part or portion 49 to the end of the piston part or portion 50. The recesses 60 are substantially semi-circular in cross section and are angularly spaced circumferentially of the piston portion 50 and may vary in number, but preferably there are at least four of such grooves or recesses. The piston portion 50 is provided with ports 61 that place the lower end of the bore 57 into communication with the recesses. A spring abutment plate or washer 62 is provided with an opening similar to a bayonet slot wherefor the piston rod 13 can be passed through the enlarged part of said opening, and then the washer 62 can be moved transversely relative to the piston rod to bring said rod into the smaller part of the opening with the edge of said smaller part of the opening engaging in the annular groove 48 in the piston rod and with the washer 62 bearing against the end of the piston part 50 and forming an abutment assembly for the piston body. The large part of the bayonet slot in the washer 62 overlies one of the recesses 60, and the washer is provided with a plurality of openings 63 which overlie the remaining recesses 60 in the upper portion of the piston body. The construction of the piston body and the washer 62 is clearly disclosed in Beecher Patent #2,396,227 issued March 12, 1946.

A flexible packing and valve ring 64 of normally circular cross section and formed of any suitable material, such as synthetic rubber for example, is mounted on a carrier 65 which is slidable on the upper portion 50 of the piston body. The carrier 65 is in the form of a ring of angular cross section having an arm that extends longitudinally or axially of the piston and contacts and slides on the piston portion 50 and a radially extending arm which overlies the upper side of the ring 64 as viewed in the drawing. It will thus be seen that the ring 64 moves with the carrier 65 toward and away from the piston portion 49 upon changes in direction of piston movement and that when the ring 64 is in the position shown in Fig. 2 it acts as a valve to close the space 52 and the passages or grooves 51, while when it is in the position indicated in Fig. 3 said space and passages are open and are in communication with the recesses or grooves 60 and the ring is functioning merely as a packing for the piston. A coil spring 66 is mounted on the piston portion 50 and abuts the washer 62 and the carrier 65 and exerts pressure on the carrier, tending to maintain the packing ring 64 in seated position as indicated in Fig. 2. The construction of the piston body so far set forth is identical with the construction shown in said Beecher Patent #2,396,227, and it will be noted that no provision is made for adjusting the tension of the spring 66. However, if it is desired to have the tension of said spring 66 adjustable, an arrangement such as disclosed in my copending application, Serial No. 750,902 filed May 28, 1947, now U. S. Patent 2,487,472, may be used.

A cup-shaped member 67 is screwed into the counterbore 53 in the lower portion 49 of the piston body, and said member has secured rigidly and centrally thereof a stud 68 which projects upwardly into the bore 56. A flat disc recoil valve 69 is slidable on the stud 68, and said valve is held normally against the valve seat boss 58 by a coil spring 70 mounted on the stud 68 and contained within a small cup-shaped member 71. A member 72 is mounted within the large cup-shaped member 67 and is held against said latter member by a heavy coil spring 73 which also acts to lock the cup-shaped member 67 in adjusted position. The member 72 has projections 74 which extend through openings in the cup-shaped member 67 and are adapted to cooperate with recesses 75 of the closure plate 42 when the shock absorber is collapsed and the piston and cylinder relatively turned to effect screwing in or out of the cup-shaped member 67 to vary the tension of the spring 70 and the action of the recoil valve 69.

In order to coordinate the description hereinbefore set forth and to bring out the advantages inherent in the construction embodying the invention a résumé of the manner in which the shock absorber functions will now be set forth. The function of the shock absorber will be described first with reference to a shock absorber having the fixed or constantly open orifice in the closure plate 42 at the lower end of the cylinder as shown in Fig. 1.

Assuming that the shock absorber is mounted on a motor vehicle and the working cylinder 35 of the shock absorber is filled with suitable oil, with a desired quantity of said oil also in the reservoir 36, it will be understood that when the vehicle springs are compressed under impact, the piston of the shock absorber will move relatively downwardly in the working cylinder 35. During such movement and particularly the initial portion thereof, the oil will be forced by the piston through the orifice 45 and into the reservoir 36. Until the pressure below the piston builds up to a point wherein it overcomes the action of the spring 66 and moves the packing ring 64 from the position shown in Fig. 2 toward the position shown in Fig. 3 no oil will flow from the lower side of the piston to the upper side thereof except a small quantity which may pass through the bleed grooves 59, bores 56 and 57, ports 61 and grooves 60. Consequently during the initial portion of the impact stroke a positive pressure is created below the piston while a substantially zero or even negative pressure is created in the working cylinder above the piston. However, as stated, when the packing ring 64 is moved from its seat upon the creation of a predetermined pressure below the piston, then the oil is free to flow from the lower side of the piston to the upper side of the piston. If this condition occurs while the piston is still moving downwardly in the cylinder and when the capacity of the cylinder above the piston is filled with oil then a certain volume of oil above the piston will be displaced by the increasing volume of the piston rod entering the cylinder. This displacement may be sufficiently great or rapid to cause excessive pressure to be developed above the piston during the impact stroke.

In order to provide a means for relieving such excessive pressure the invention contemplates using the cup valve member 41. The tension of the coil spring 40 will be such as to allow the valve member 41 to move off its seat on the slightly raised walls 30 around the perimeters of the grooves 29, whereupon oil will be free to flow through the ports or openings 33 from the upper end of the working cylinder and into the grooves 29 and thence into the counterbore 27 from whence it will flow or cascade between the legs 24 downwardly of the outer side of the cylinder 35 and into the reservoir 36. Consequently any excessive pressure created in the working cylinder above the piston during the impact stroke will be relieved by the unseating of the valve 41 and the oil passing upwardly through the plug 15 as described and into the counterbore 27 which may be termed an expansion chamber will quickly have its pressure reduced and then will flow into the reservoir as stated during which flow it effects a cooling action on the working cylinder preventing the creation of excessive heat in the shock absorber.

The conditions under which sufficient pressure may be created in the working cylinder above the piston to cause the valve 41 to unseat may occur because of viscosity changes in the oil, sudden or quick movement of the piston, or for various other reasons. It will also be noted that since the cup valve member 41 has a metal to metal contact with its seat 30 any air which is in the upper end of the working cylinder can escape therefrom through the openings 33 and between the valve 41 and its seat, although the the metal to metal contact of the valve with its seat is sufficient to prevent the escape of oil.

Furthermore the air escaping in the manner stated from the working cylinder passes into the counterbore or expansion chamber 27 and its pressure is quickly reduced, wherefore the creation of foam or emulsified oil is substantially eliminated.

Upon the recoil or expansion of the vehicle springs the piston of the shock absorber will move upwardly in the working cylinder 35 and such movement will cause oil to be drawn into the working cylinder 35 below the piston from the reservoir 36 through the orifice 45 and also through a replenishing valve if one is employed in the closure plate 42 in addition to the orifice 45.

During the upward movement of the piston on the recoil stroke pressure will be developed above the piston until the recoil valve 69 is unseated, whereupon oil will be free to flow from the upper side of the piston to the lower side thereof it being understood that during the recoil stroke the packing ring 64 will be in the position shown in Fig. 2.

During the recoil stroke should the pressure above the piston exceed a predetermined pressure then the valve member 41 will move off its seat and the oil can flow from the upper end of the working cylinder outwardly through the openings 33 and thence to the reservoir as already explained in connection with the impact stroke. Consequently it will be understood that an efficient and effective relief valve is provided for relieving excessive pressures in the working cylinder. In addition this relief valve provides for venting air from the working cylinder and also the oil flowing through the relief valve and back to the reservoir has a cooling effect on the shock absorber.

Assuming that the closure plate 42 for the lower end of the shock absorber is provided with only a replenishing valve such as the valve 46 and does not have an open orifice, then the shock absorber can function similarly to the circulating type of shock absorber. When this condition obtains the impact or downward stroke of the piston in the working cylinder immediately causes pressure to build up below the piston sufficient to move the ring 64 from its seat and to allow oil to flow freely to the upper side of the piston. Consequently the entering piston rod causes a displacement of an equivalent volume of oil with a resultant build-up of pressure on the upper side of the piston. This built-up pressure causes the valve 41 to move off its seat and oil to flow outwardly of the working cylinder through the openings 33 in a volume equal to the displacement by the rod 13. This displaced oil then flows into the reservoir 36 as previously explained. Upon the recoil or upward stroke of the piston in the working cylinder oil is drawn from the reservoir through the replenishing valve 46 and into the working cylinder below the piston to fill the cylinder below the piston and prevent the creation of a vacuum therein. Also as soon as the pressure of the oil above the piston is sufficient to unseat the recoil valve 69 then the oil will flow through the piston from the upper side thereof to the lower side. In case the pressure above the piston during the recoil stroke becomes excessive the valve 41 will be unseated to relieve such pressure.

Although a preferred embodiment of the invention has been illustrated and described herein, it will be understood that the invention is susceptible of various modifications and adaptations within the scope of the appended claims.

Having thus described my invention, I claim:

1. In a hydraulic shock absorber having a working cylinder, a closure plug at one end of said cylinder, a piston rod slidably mounted in said plug and extending into said cylinder and provided therein with a piston, a housing surrounding said cylinder in spaced relation and provided with a closure cap spaced from said plug and through which said rod extends, the space between said housing and the exterior of said cylinder constituting a reservoir, said cap being provided with means forming communication between said reservoir and the space between said cap and said plug, packing means carried by said cap and engaging said rod and a coiled spring having one end acting on said packing means; the improvement which comprises said plug having a counter-bore communicating with the space between said plug and said cap and a through passage communicating with the interior of the working cylinder and with said counter-bore, the side wall of said counter-bore being provided with spaced inwardly extending guide lugs, a metal cup located in said counter-bore and having its side wall guided by said lugs, and being provided with a central opening through which said rod extends, said coil spring having its other end seated within said cup and confined by the side wall thereof, said spring acting for the dual purposes of maintaining said cup seated under spring load in said counter-bore to close said passage and of imparting a spring load to said packing means to cause the latter to grip said rod.

2. The improvements defined in claim 1 and wherein said plug is provided with a plurality of through passages communicating with the interior of said working cylinder and said counter-bore, while said counter-bore is provided at its bottom with grooves communicating with said passages and surrounded on their perimeters with raised ribs against which said cup seats under said spring load.

WILLIAM G. PATRIQUIN.

REFERENCES CITED

The following references are of record in the file of this patent:

UNITED STATES PATENTS

| Number | Name | Date |
|---|---|---|
| 2,107,974 | Bechereau et al. | Feb. 8, 1938 |
| 2,173,574 | Binder et al. | Sept. 19, 1939 |
| 2,369,007 | Beecher | Feb. 6, 1945 |